March 2, 1926. 1,574,861

E. BEHRINGER

COOLING HOLDER FOR MILK AND THE LIKE

Filed Dec. 16, 1924 4 Sheets-Sheet 1

Inventor:
Emil Behringer,
By his Atty. Harold O. Penney

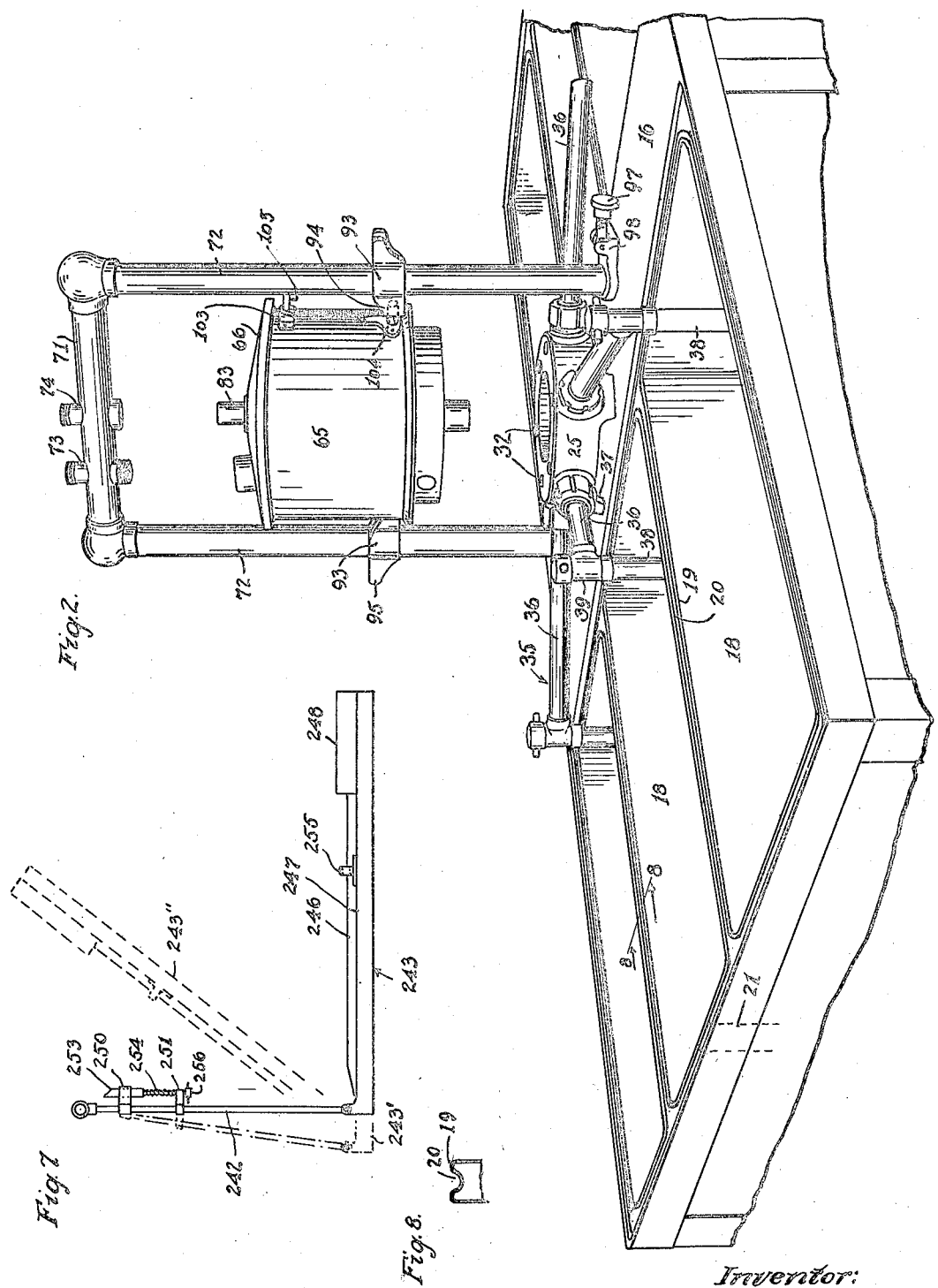

March 2, 1926.
E. BEHRINGER
1,574,861
COOLING HOLDER FOR MILK AND THE LIKE
Filed Dec. 16, 1924     4 Sheets-Sheet 3

Inventor:
Emil Behringer,
By his Atty. Harold D. Penny

March 2, 1926.
E. BEHRINGER
1,574,861
COOLING HOLDER FOR MILK AND THE LIKE
Filed Dec. 16, 1924   4 Sheets-Sheet 4
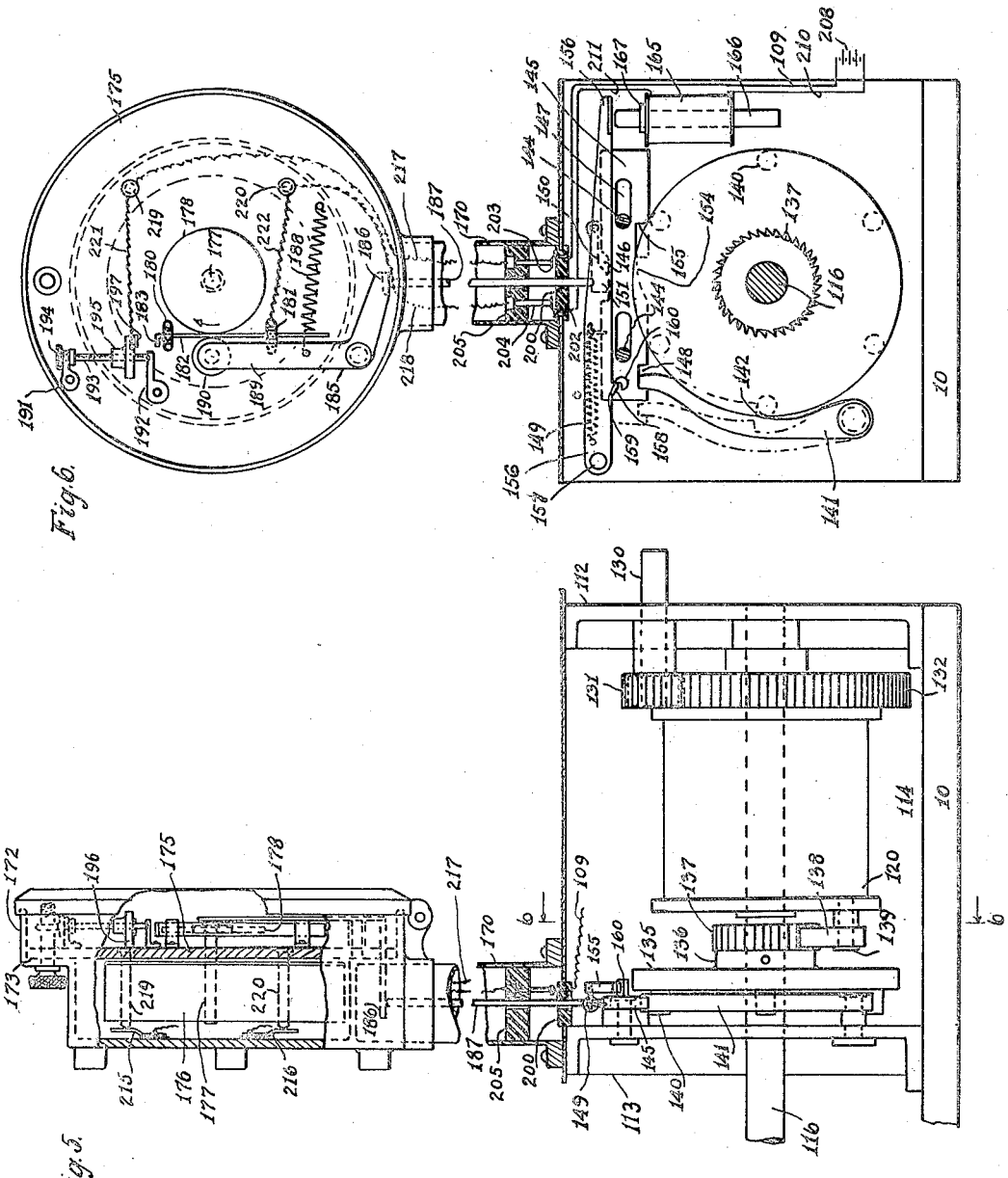
Inventor:
Emil Behringer:
By his Atty.

Patented Mar. 2, 1926.

1,574,861

UNITED STATES PATENT OFFICE.

EMIL BEHRINGER, OF BROOKLYN, NEW YORK.

COOLING HOLDER FOR MILK AND THE LIKE.

Application filed December 16, 1924. Serial No. 756,259.

*To all whom it may concern:*

Be it known that I, EMIL BEHRINGER, a citizen of the United States, and resident of borough of Brooklyn, city of New York, in the county of Kings and State of New York, have invented certain new and useful Improvements in Cooling Holders for Milk and the like, of which the following is a specification.

This invention relates to apparatus for holding milk a predetermined time in treating tanks during pasteurizing processes, though it is noted that the invention is not limited to apparatus for treating milk nor in some respects even to pasteurizing or heating processes.

One object of the invention is to improve generally the apparatus of this kind shown in my co-pending United States application, Serial No. 649,666 filed July 5, 1923, for milk holding apparatus.

Another object of the invention is to provide an apparatus of this kind having improved and simpled milk distributing means for successively emptying and filling the milk tanks.

Another object of the invention is to provide an apparatus of this kind in which the various parts are easily dismountable for cleaning.

Another object of the invention is to provide an improved timing means for controlling the distributing means.

Another object of the invention is to provide means for preventing the overflow of milk from the treated tanks to the untreated tanks.

Another object of the invention is to provide improved covers for the tanks and apparatus for controlling said covers.

Other objects of the invention are to improve generally the simplicity and efficiency of such devices and to provide apparatus of this kind which are durable, economical to manufacture and operate and which will not get out of order.

Still other objects of the invention will appear as the description proceeds; and while herein details of the invention are described, the invention is not limited to these since many and various changes may be made without departing from the scope of the invention as claimed.

The inventive features for the accomplishment of these and other objects are shown herein in connection with an improved milk holding apparatus which, briefly stated, includes a plurality of tanks and means including a rotary turret adapted to be advanced to cooperative relation with the tanks successively to withdraw treated milk or other liquid from one tank and then to fill the emptied tank with liquid to be treated. A yieldable drive means including a drum and weighted cable serves for driving said rotary turret by fractions of rotations as controlled by an escapement acting on said drive means for holding said rotary means in operative position a proper length of time for withdrawing and supplying the liquid until released by a timing means for releasing the escapement after this length of time has been consumed.

In the accompanying drawings, showing by way of example one of many possible embodiments of the invention, Fig. 1 is a perspective view showing the completely assembled apparatus;

Fig. 2 is a fragmental perspective view showing the upper part of the apparatus partly disassembled;

Fig. 5 is a vertical sectional view partly in elevation, showing the drum, escapement and timing means;

Fig. 6 is a section taken on the line 6—6 of Fig. 5;

Fig. 7 is a side elevation showing the tank cover control means; and

Fig. 8 is a sectional view taken on line 8—8 of Fig. 2.

*The tanks and supports therefor.*

Figure 1:
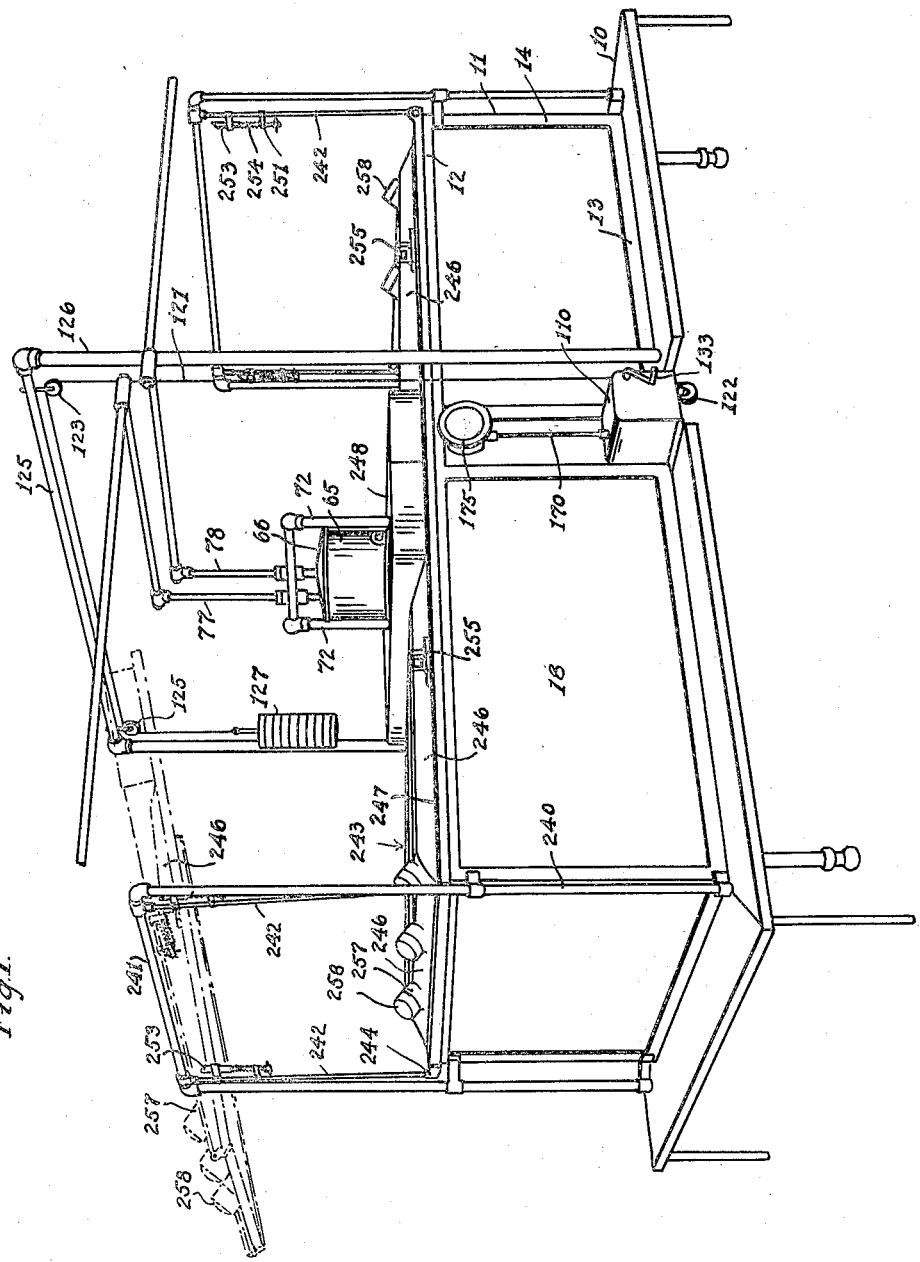

My improved apparatus is carried on a rectangular supporting table 10 on which is mounted a frame 11 comprising upper and lower side pieces 12 and 13, corner pieces 14 and a fixed transverse plate member 16 (Fig. 2) at its mid part.

A plurality of rectangular elongated tanks 18 in said frame on said table arranged in groups of three with their ends near said member 16 carry gutter frames 19 resting on the top edges of the tanks and provided with a trough or gutter 20 separating the tanks to catch and prevent any overflow from one tank to the other to prevent mixing of untreated with treated milk, said gutter frame being provided with a suitable drain channel 21 to conduct away any overflow.

The distributing means.

Figures 3, 4:
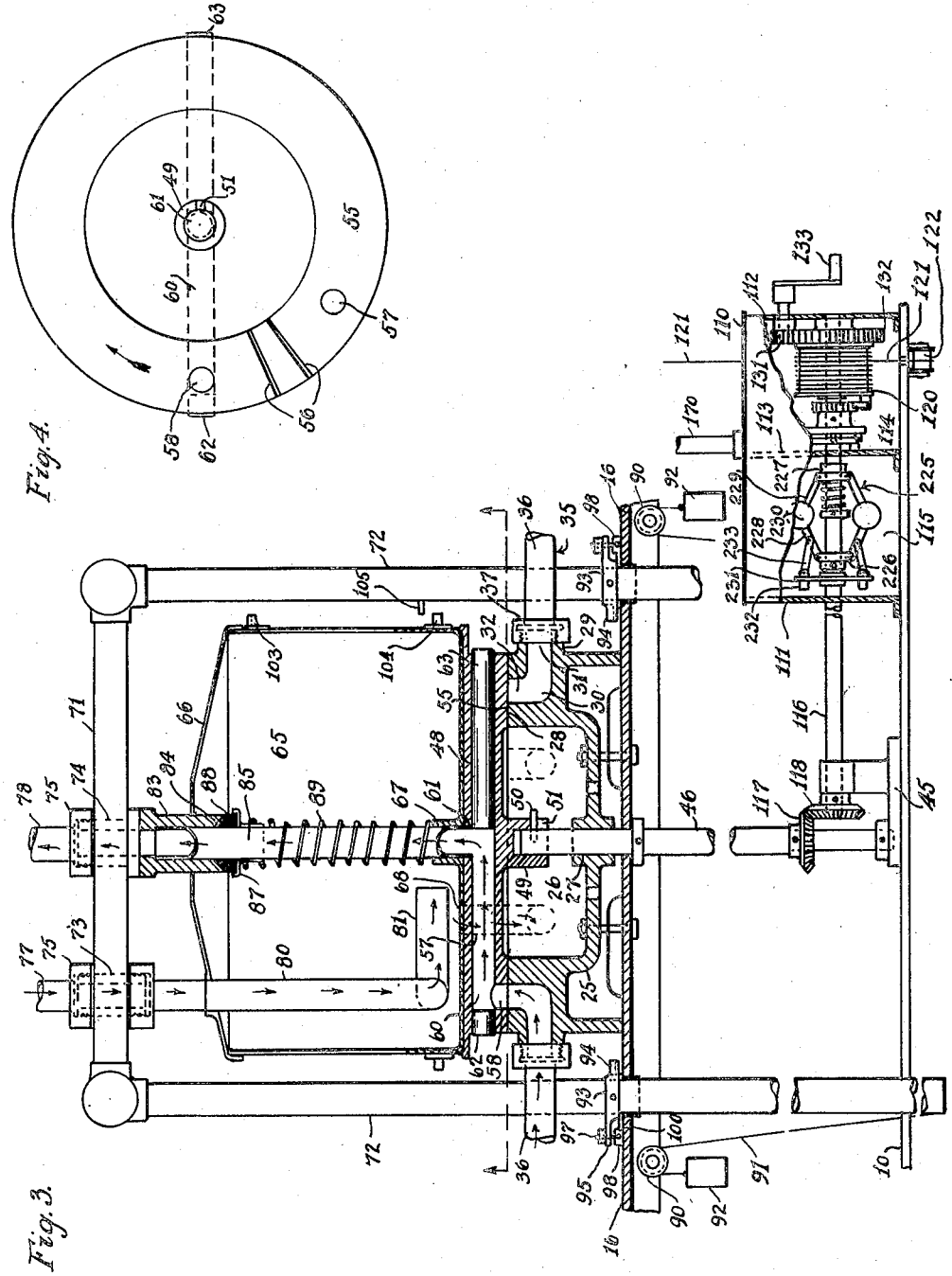
Fig. 3 is a transverse vertical sectional view, partly in elevation, showing the turret and associated parts and the drive means.
Fig. 4 is a bottom plan of the turret.

A turret base 25 secured on said member 16 is provided with an intramarginal depression 26 (Fig. 3), a central vertical bearing bore 27, a horizontal ground contact face 28 surrounding said depression, a plurality of radial bosses 29, and a plurality of channels 30, one for each tank, each channel comprising a radial outer end 31 extending through one of said bosses and an upturned inner end port 32 passing through said contact face 28, the ports 32 being, in the present instance, exactly 60° apart (Fig. 2). Combined filling and emptying pipes 35 extend from said channels 30 to near the bottom of the tanks respectively. Each pipe comprises a radial portion 36 detachably connected to the outer end of the boss 29 by a connecting collar 37, and a vertical portion 38 detachably connected to the radial portion 36 by a detachable elbow connection 39. This arrangement permits the pipes to be easily disconnected and cleaned.

A bearing bracket 45 (Fig. 3) mounted on said table beneath said bearing bore 27 supports a vertical shaft 46 rotatably resting in said bracket and having its upper end projecting through said bore 27 into said depression 26. Means for rotating said shaft step-by-step 60° at a time at predetermined equal intervals will be described at length hereinafter.

A rotary turret 48 disposed on said base 25 is provided with a central boss or hub 49 mounted on said shaft 46, and constrained to rotate therewith by a pin 50 in the shaft engaging in a slot 51 in the hub. Said turret has a ground lower surface 55 (Fig. 4) resting liquid-tight on said contact face 28, and provided with suction breaking radial grooves 56 disposed between a single vertical filling opening 57 registerable with any one of said ports 32, and a downturned portion 58 of an emptying duct comprising a diametric portion 60 (Fig. 3) extending horizontally through the turret and an axial portion 61 extending from the center of the diametric portion through the top of the turret. The downturned portion 58 is disposed 60° in advance of said filling opening 57 and is successively registerable with each adjacent port in advance of the one with which the filling opening then registers. Long and short plugs 62 and 63 removably secured respectively between said axial portion 61 and said downturned portion 58 and the adjacent ends of the diametric portion are removable for cleaning purposes. The radial suction breaking grooves prevent the sucking of untreated milk from the filling opening 57 to the downturned emptying portion 58, as will be later explained. A cylindrical surge chamber 65 having a flanged cover 66 is mounted fast on said turret and has a central inner opening surrounded by a central boss 67 and an outer opening 68 respectively registering with said filling opening 57 and said axial portion 61.

Distributor disassembling means.

A vertically movable frame comprising a cross bar 71 disposed above said cover and posts 72 vertically slidable passing through said fixed transverse member and the table carries outer and inner short vertical supporting pipe sections 73 and 74 mounted in said cross bar, and detachably connected by means of clamping collars 75 to supply and suction pipes 77 and 78 leading respectively to a milk supply and suction pump, not shown. A filling pipe 80 is detachably connected to the lower end of said outer section 73 and has a forwardly turned lower end 81 discharging into the surge chamber.

A collar connection 83 detachably secured on the lower end of said inner section and forming a downwardly disposed pipe receiving socket surrounded by an inwardly beveled face 84 receives the upper end of an axial pipe 85 having its lower end received in said central boss 67 and the axial portion of the emptying duct. A stuffing cap 87 slidable on said axial pipe carries a packing 88 disposed around said pipe and engaging said beveled face 84 under the action of a spring 89 on said pipe compressed between said cap and said central boss 67.

Pulleys 90 mounted beneath said transverse member 16 receive flexible members 91 disposed over said pulleys and having one end secured to the lower ends of said posts 72. Weights 92 secured to the other ends of said flexible members assist in raising said movable frame, when desired. A chair collar 93 fast on each of said posts limits downward movement of the movable frame and each is provided with an inwardly disposed upwardly open seat 94 and a pair of outwardly disposed closely spaced shoulder lugs 95 between which are received shackle bolts 97 having their inner ends pivoted between ears 98 of guide collars 100 fast on said transverse member 16 and slidably receiving and guiding said posts. Clamp nuts 91 on the threaded ends of said bolts are adapted to seat on said shoulder lugs 95 when the bolts are between the lugs, thereby to hold said movable frame against upward movement.

Said open seats 94 and inverted chairs 103 mounted on the upper part of said chamber respectively receive projecting pins 104 and 105 of brackets mounted on said posts and the lower part of said chamber when said posts are raised, thereby to raise said chamber and turret to the position of Fig. 2, for purposes of disassembling and cleaning.

The turret rotating means.

A box 110 (Fig. 3) mounted on said table has end and intermediate walls 111, 112 and 113 dividing the box into a drum housing 114 and a governor housing 115. A drive or drum shaft 116 mounted in said bearing bracket 45 and passing through said wall is operatively connected to said drive vertical shaft by means of equal beveled gears 117 and 118 whereby the shafts have equal speeds. A drum 120 in the drum housing loosely mounted on said drive shaft receives a cable 121 wound around said drum and disposed under a pulley 122 under the table and pulleys 123 and 124 at opposite ends of a cross beam 125 (Fig. 1) of a transverse middle frame having posts 126 fixed on opposite sides of said table. The cross beam 125 is disposed a considerable distance above said transverse plate member 16 and the movable frame 71, 72. A weight 127 at the free end of the table tends to unwind the cable and revolve the drum.

The drum winding means.

A winding shaft 130 (Fig. 5) rotatably mounted in the outer wall 112 of the drum housing carries a pinion 131 meshing with said winding gear 132 fast to one end of the drum. A crank 133 (Fig. 3) on said winding shaft serves as a means whereby said cable is wound up. An escapement disk 135 (Fig. 5) mounted fast on said drive shaft is provided with a hub 136 having ratchet teeth 137 engaged by a pawl 138 pivotally mounted on a pivot pin 139 on the inner end face of the drum and adapted to cam over said teeth to permit the drum to revolve in winding direction without revolving the drive shaft and to positively engage the teeth to drive the drive shaft when the drum is rotated by the weight.

The escapement.

A series of escapement pins 140 (Fig. 6) mounted 60° apart on the face of said disk near the periphery thereof cooperate with a pawl lever 141 pivoted to said intermediate wall 113 and provided with a shoulder 142 adapted to engage any one of said escapement pins to hold said turret in any one of its operative positions. A pair of guide pins 144 mounted on said intermediate wall support an actuating slide bar 145 provided with an upper cam recess 146 and between the edges with longitudinal slots 147 received on said guide pins to guide the bar, and with a lower marginal recess 148 receiving the free end of the pawl lever to move the latter from operative latching position or inoperative releasing position. A spring 149 is tensioned between said bar and a staple on the intermediate wall for drawing said bar and pawl lever to unlatching position to release the disk. A cam lever 150 pivoted to said intermediate wall or partition 113 has a cam lug 151 at its free end engaging in said cam recess 146 whereby the cam lever is raised when the bar is moved by said spring for a purpose which will be later explained.

Said bar 145 is provided at its lower edge with an elongated intermediate notch 154 forming a shoulder 155 engageable by one of said escapement pins 140, when the disk and bar have been released to restore said bar and pawl lever to latching position. A latch lever 156 fulcrumed as at 157 on said intermediate wall is provided with an intermediate projection having a cam edge 158 and a shoulder edge 159 cooperating with a shouldered pin 160 fast on said slide bar and engageable by said cam edge 158 as said slide bar and pawl are moved to latching position and engageable by said shoulder edge 159 to hold said bar and pawl lever in latching position after they have been restored.

A vertical solenoid 165 mounted on said wall 113 carries therein an armature 166 disposed beneath the free end of said latch lever 155 and provided with a collar 167 fast thereon resting on the solenoid normally holding the armature with its upper end projecting less than the lower end. Electric timing means energize said solenoid at stated intervals to raise the latch lever and release the escapement permit said disk 135 and turret 48 (Fig. 3) to move one step.

The electric timing means.

A hollow column 170 mounted on said box over an opening over said cam lever 150 carries a clock case 172 (Fig. 5) provided with an inner annular shoulder 173 on which is secured a fibroid partition 175 carrying a clockwork 176 in the case behind said partition provided with a minute arbor 177 projecting through the partition and carrying a friction wheel 178 fast on the arbor.

Upper and lower guide brackets 180 and 181 (Fig. 6) mounted on said partition receive a contact bar 182 slidable in said brackets and provided with a laterally turned upper contact end 183 limiting its downward movement by engagement with the upper bracket, said bar being intermediately engageable with said friction wheel on the rising side of the wheel. A bell crank pressure lever 185 pivoted at its elbow part on said fibroid partition 175 has its lower arm laterally turned disposed with its free end 186 resting on a lifting rod 187 resting on said cam lever 150. A spring 188 tensioned between the upper arm 189 and a pin in said partition presses roller 190 carried by said arm against the contact bar 182 and the latter in frictional engagement with the friction wheel 178, whereby the contact bar rises as the wheel rotates.

Upper and lower bearing brackets 191 and 192 above said guide brackets carry an adjusting screw 193 rotatable in said bearing brackets and provided at the upper end with a manipulating head 194. Said screw supports a block 195 having a threaded bore received on said screw and having a flat face 196 (Fig. 5) engaging said partition to prevent turning when the adjusting screw is rotated, whereby the height of said block may be adjusted. An insulated contact plate 197 (Fig. 6) carried on the lower face of said block is engaged by said contact bar when the latter is raised from the guide bracket 180 to the contact plate by the friction wheel, within a length of time depending upon the height to which the block 195 is adjusted.

An insulating disk 200 mounted in said opening in the box having a central opening therein for the reception of the lifting rod supports contact members 202 passing through said disk and carrying contact springs 203 engaged by contact pins 204 passing through an insulating plug 205 in said column near the lower end thereof and also provided with a central opening for said lifting rod. A suitable source of current 208 is connected by conductors in series with said solenoid between said members 202 and therefore with the pins 204.

Spring contact plates 215 and 216 (Fig. 5) insulated on the back of said case and electrically connected by conductors 217 and 218 (Fig. 6) to said contact pins 204 are engaged by contact rods 219 and 220 passing through said partition and connected by conductors 221 and 222 with said insulated plate 197 and the lower guide bracket 181 respectively.

Operation of the timing means and escapement means.

When the contact bar 182 comes into engagement with the insulated contact plate 197, current passes through the circuit including said source 208, solenoid 165, contact bar 182 and insulated plate 197, thereby energizing said solenoid, raising said core 166 and latch lever 156, releasing said sliding bar 145, said latch pawl 141 and said escapement disk 135, thus raising the cam lever 150, said lifting rod 187 and said lower arm 186 and moving said roller 190 from the contact bar, thus permitting the contact bar to fall to break said circuit. When the escapement disk 135 is thus released, it moves until the next escapement pin 140 engages said shoulder 155 of the slide bar thereby to restore the slide bar to latched position, thus permitting said cam lever 150 and the lifting rod to fall and said roller to again engage said contact bar, to cause said bar to rise again and cause the repetition of the above operation. The height of the bracket 180 is so selected and the height of the block 195 and plate 197 is so adjusted relative to the speed of the friction wheel 178, that the laterally turned end will travel from the upper bracket 180 to the plate 197 in the exact length of time required between the successive step by step movements of the turret.

The governor.

In order to prevent the too rapid rotation of the turret and chamber I provide a governor 225 (Fig. 3) comprising a fixed collar 226 fast on the shaft, and an outwardly spring pressed slidable collar 227 together carrying the usual links 228 and 229 carrying balls 230. A slidable member 231 carries friction feet 232 and adapted when the speed reaches its maximum to be pressed against the wall 111 by the links 233 connecting said member 231 with the links 228.

The tank cover and cover supports.

Supporting frames resting on the respective ends of the table 10 and each comprising corner posts 240 (Fig. 1) strapped to the tanks and a top bar 241 disposed a considerable distance above the outer ends of the tanks, carry link rods 242 pivoted on the end portions of the top bars and normally pending to near the outer ends of the tanks. Covers 243 normally respectively disposed over the two groups of tanks and hinged as at 244 to said links each comprise an intramarginal plateau, slopes 246 around said plateau, a flat margin 247 (Fig. 7) disposed around said slopes over the outermost gutters, and an inner end platform 248 disposed adjacent to said turret and over said radial pipe portions 36 and meeting the adjacent platform at the mid plane of the apparatus.

Upper and lower bolt brackets 250 and 251 mounted near the upper ends of said link rods carry bolt members slidable in the brackets and comprising beveled bolt heads 253 in the upper brackets and headed spindles 256 in the lower brackets. Springs 254 on the respective spindles compressed between said lower brackets and bolt heads yieldably move the bolts into position to cooperate with striking members 255 mounted on said margins 247 and engageable by the bevels of said bolt heads and adapted to receive the bolt heads when the covers are raised to near said link rods, whereby the covers may be balanced under said bars in approximately horizontal position as shown by the dotted line of Fig. 1, to permit cleaning of the tanks and gutters.

Bosses 257 on the end slopes have sight openings therethrough by means of which the milk may be observed. Covers 258 on said bosses prevent the ingress of foreign matter.

*Operation of the apparatus as a whole.*

The operation of the apparatus is simple and obvious from the foregoing and now need be only briefly summarized.

Milk to be treated is supplied from the pasteurizer to the pipe 77 at such a rate that the milk passing through the pipes 77 and 80 (Fig. 3), the openings 68 and 57 the channel 30 and the pipe 35 will fill a tank in the length of time required for the laterally turned end 183 (Fig. 6) of the contact bar 182 to rise from the upper bracket 180 into contact with the plate 197. At the same time milk is being drawn from the tank next in advance, by means of a suction pump (not shown) acting through the pipes 78 and 85 (Fig. 3) the duct 60 and pipe 35, so that the advance tank is empty by the time the preceding tank is filled.

When the above mentioned contact takes place, the solenoid 165 (Fig. 6) is energized, the escapement is released and the turret moved through an angle of 60° to bring the opening 57 (Fig. 3) into register with the port 32 communicating with the tank that has just been emptied, and the downturned portion 58 into register with the port in communication with the tank in advance of the one that has just been emptied.

The above operation is repeated until all of the tanks are emptied and filled, and this circle of operations is repeated as long as desired or until all of the milk is treated or until it is desired to clean the apparatus.

The rate of flow of milk to and from the tanks, the size of the tanks, and the time interval between impulses of the timing apparatus, are all such that the milk is left in the tank the required length of time for treatment during the time required to make the cycle of the tanks.

When it is desired to clean the apparatus, the covers 243 are slid from the position of the solid lines of Figs. 1 and 7 back to the position 243' of Fig. 7. The cover is then swung through the position 243'' of Fig. 7 to locking position relative to the links 242 to permit the bolt 253 to lock in the striker 255, so that the cover may swing to the position of the dotted lines of Fig. 1. With the covers thus removed, the pipes 35 may be disassembled and these pipes and the tanks and gutters may be cleaned.

In order to clean the turret and associated parts, the pipes 77 and 78 and 80 (Fig. 3) are disconnected from the sections 73 and 74 and the shackle bolts 97 are unfastened, permitting the movable frame to rise, carrying the socket 83 from the axial pipe 85 and bringing the seat 94 and finger 105 into engagement respectively with the finger 104 and the chair 103, thus raising the surge chamber 65 and the turret secured fast thereto to the position of Fig. 2. This permits the easy removal of the cover 66, the parts 83, 85, 87, 88 and 89 and the plugs 62, 63, whereby these parts, the faces 28, 65, channels 30 and ducts 60 may be easily cleaned. The parts are easily reassembled in the reverse manner.

Continued suction in the emptying duct necessary for the proper operation of the machine tends to suck into the downturned portion 58 (Fig. 4) milk immediately adjacent thereto on the ground lower surface 55. In order to prevent this suction extending to the filling opening 57 and thus draw untreated milk from the filling opening into the emptying duct, thus to contaminate the treated milk, the radial suction-breaking grooves are provided in said surface 55 to break up, or limit, said suction by establishing a passage communicating with the atmosphere, so that the suction will draw in a bit of air instead of untreated milk from the filling opening 57.

I claim as my invention:

1. In combination, a plurality of tanks; a base having ports communicating with the tanks; and rotary means resting on and upwardly removable from said base and adapted to be advanced from port to port and to withdraw liquid from one tank and then to fill the emptied tank with other liquid.

2. In combination, a plurality of tanks; a base having ports therein communicating with the tanks; and a rotary member resting on and upwardly removable from said base and having suction and supply means adapted to be advanced from port to port and to withdraw treated liquid from one tank and then to fill the emptied tank with liquid to be treated.

3. In combination, a plurality of tanks; pipes to said tanks; and a rotary means above the level of said tanks adapted to be advanced from pipe to pipe and to withdraw treated liquid from one tank and then to fill the emptied tank with liquid to be treated.

4. In combination, a plurality of tanks; a turret base provided with a flat top contact face and channels, each comprising a port passing through said face equal angles apart; pipes from said channel to the tanks respectively; a turret having a flat bottom resting on said base and provided with a filling opening and a duct registerable with separate ports; means for supplying liquid to said opening and withdrawing it from said duct; and means for moving said turret means step by step.

5. In combination, a plurality of tanks; a turret base provided with a contact face and channels, each comprising a port passing through said face at equal angles apart; pipes from said channels to said tanks respectively; a vertical shaft having its upper end projecting through said base; means for rotating said shaft step-by-step; and a turret fast on said shaft provided with a lower surface resting on said contact face, a single vertical filling opening successively registerable with said ports, and an emptying duct comprising a diametric portion, an axial portion extending through the top of the turret, and a downturned portion registerable with each port immediately in advance of the one with which the filling opening registers; means supplying liquid to the filling opening and sucking it from said axial portion.

6. In combination, a plurality of tanks; a turret base provided with an intramarginal depression, a central vertical bearing bore, a horizontal ground contact face surrounding said depression, a plurality of radial bosses, and a plurality of channels, one for each tank, each comprising a radial outer end extending through one of said bosses and an upturned inner end port passing through said contact face 60° apart; combined filling and emptying or distance pipes from said channels to near the bottom of the tanks respectively; a vertical shaft passing through said bore into said depression; means for rotating said shaft step-by-step; a turret fast on said shaft and resting on said base and provided with a filling opening successively registerable with said ports, and a duct comprising an axial portion extending upwardly and a downturned portion registerable with each port in advance of the filling opening; and means supplying liquid to the filling opening and withdrawing it from said axial portion.

7. In combination, a plurality of tanks; a turret base provided with a contact face and channels, each comprising a port passing through said face at equal angles apart; pipes from said channels to said tanks respectively; a turret on said base and provided with a lower surface resting on said contact face, a filling opening successively registerable with said ports, and an emptying duct registerable with each port immediately in advance of the one with which the filling opening registers; means supplying liquid to the filling opening and sucking it from said duct; and means for rotating the turret step by step.

8. In combination, a plurality of tanks; means for emptying and filling the tanks including jointed pipes which are separable for cleaning and having free ends dipping into and disconnected from the tanks.

9. In combination, a plurality of tanks; a turret base provided with channels, each comprising a port passing through the top of said base; pipes from said channels to the tanks respectively; each pipe comprising a radial portion detachably connected to the outer end of the channel by a connecting collar and a vertical portion detachably connected to the radial portion by a detachable elbow connection; a vertical shaft; means for rotating said shaft step by step; a turret fast on said shaft and resting on said base and provided with a filling opening successively registerable with said ports, and a duct comprising an axial portion extending upwardly and a downturned portion registerable with each port in advance of the filling opening; and means for supplying liquid to said filling opening and withdrawing it from said axial portion.

10. In combination, a table; a plurality of tanks thereon; a turret base above the table provided with a central bearing bore, and channels, each comprising a port passing through the top of said base; pipes from said channels to the tanks respectively; a vertical shaft; a turret fast on said shaft and resting on said base and provided with a filling opening successively registerable with said ports, and a duct registerable with each port in advance of the filling opening; means for supplying liquid to said filling opening and withdrawing it from said duct; a bearing bracket mounted on said table beneath said bearing bore; a vertical shaft rotatably resting in said bracket and having its upper end projecting through said bore; and means for rotating said shaft step by step 60° at a time at predetermined equal intervals.

11. In combination, a plurality of tanks; and means for emptying and filling the tanks including relatively movable contact members, one having a pair of ports and the other a filling opening and a suction duct registerable with said openings respectively, and a groove in its face between said opening and duct.

12. In combination, a plurality of tanks; a turret base provided with ports; pipes from said ports to said tanks; a turret resting on said base provided with a filling opening and a duct separately registerable with said ports; means for supplying liquid to said filling opening; and means for withdrawing liquid by suction from said duct; the lower face of said turret being provided with a suction breaking groove disposed between said opening and duct.

13. In combination, a plurality of tanks; a turret base provided with a contact face and channels, each comprising a port passing through said face; pipes from said channels to said tanks respectively; a turret provided with its lower surface resting on said contact face, a filling opening successively registerable with said ports, and an emptying duct comprising an axial portion extending through the top of the turret, and a downturned portion registerable with each port in advance of the one with which the filling opening registers; means supplying liquid to the filling opening and sucking it from said axial portion; and means for rotating the turret step by step; said lower surface being provided with radial suction breaking grooves disposed between said filling opening and said downturned portion.

14. In combination, a plurality of tanks: means for emptying and filling the tanks including a member having a duct comprising an intermediate portion and lateral portions joining the intermediate portion; and closure means in the ends of the intermediate portion.

15. In combination, a plurality of tanks; means for emptying and filling the tanks; said means including a rotary member adapted to assume successive positions relative thereto, and having a horizontally extending portion extending from the mid part of the horizontal portion and a downturned portion; removable plugs removably disposable respectively between said upper portion and said downturned portion and the adjacent ends of the horizontal portion; and means for moving said rotary member step by step to said successive positions.

16. In combination, a plurality of tanks; a turret base provided with a contact face and channels, each comprising a port passing through said face; pipes from said channels to said tanks respectively; a turret on said base and provided with a lower surface resting on said contact face, a single filling opening successively registerable with said ports, and an emptying duct comprising a diametric portion, an upper portion extending through the top of the turret and a downturned portion registerable with each port in advance of the one with which the filling opening registers; means supplying liquid to the filling opening and sucking it from said upper portion; removable plugs in the ends of the diametric portion; and means for rotating the turret step by step.

17. In combination, a plurality of tanks; a turret base provided with channels, each comprising a port passing through the top of said base; pipes from said channels to the tanks respectively; a vertical shaft; means for rotating said shaft 60° at a time; a turret fast on said shaft and resting on said base and provided with a filling opening successively registerable with said ports, and a duct comprising a diametric portion extending horizontally through the turret, an axial portion extending from the middle of the diametric portion through the top of the turret, and a downturned portion 60° in advance of said filling opening and registerable with each adjacent port in advance of the one with the filling opening registers; long and short plugs removably disposed respectively between said axial portion and said downturned portion and the adjacent ends of the diametric portion, said plugs being removable for cleaning purposes; and means for supplying liquid to the filling opening and withdrawing it from the axial portion of the duct.

18. In combination, a plurality of tanks; a turret base provided with ports; pipes from said ports to said tanks; a turret on said base provided with a filling opening and a duct respectively registerable with adjacent ports; a chamber on said turret having an opening registerable with said filling opening; means for supplying liquid to the chamber; and means for withdrawing it upwardly from said duct.

19. In combination, a plurality of tanks; a turret base provided with ports in its face; pipes from said ports to the tanks respectively; a turret on said base and provided with a filling opening and a duct registerable with separate ports; means for rotating the turret step by step; a cylindrical surge chamber mounted on said turret and having an inner axial opening surrounded by a central boss and an outer opening respectively registerable with filling opening and said duct; an axial pipe having its lower end received in said central boss and duct; means for supplying liquid to the chamber; and means for withdrawing it from said axial pipe.

20. In combination, a plurality of tanks; a turret base provided with a contact face provided with ports; pipes from said ports to said tanks; a turret on said base provided with a filling opening successively registerable with said ports, and a duct comprising an axial portion extending axially through the top of the turret and a lower portion registerable with each port in advance of the one with which the filling opening registers; means for rotating the turret step by step; a cylindrical surge chamber mounted on said turrets and having an inner axial opening surrounded by a central boss and an outer opening respectively registerable with filling opening and said axial portion; an axial pipe having its lower end received in said central boss and the axial portion of the emptying duct; means for supplying liquid to the chamber; and means for withdrawing it from said axial pipe.

21. In combination, a plurality of tanks; a turret base provided with ports; pipes from said ports to said tanks; a turret on said base provided with a filling opening and a duct successively registerable with different ports; a chamber on said turrets communicating with said filling opening and having an axial opening; an axial pipe received in said axial opening and duct; means for supplying liquid to the chamber; and means for withdrawing it from said axial pipe.

22. In combination, a plurality of tanks; a turret base provided with ports; pipes from said ports to said tanks; a turret on said base provided with a filling opening and a duct registerable with adjacent ports; a chamber on said turret having an axial pening, and an opening registering with said filling opening; an axial pipe received in said axial opening and duct; a vertically movable frame comprising a cross-bar disposed over said chamber; a pipe section carried by said cross bar; a collar connection detachably secured on said section and forming a socket surrounded by an inwardly beveled face; a cap slidable on said axial pipe; a packing in said cap and engaging said face; a spring on said pipe compressed between said cap and the bottom of the chamber; and means for supplying liquid to the chamber and withdrawing it from said section.

23. In combination, a plurality of tanks; a turret base provided with ports; pipes from said ports to said tanks; a turret on said base provided with a filling opening and a duct separately registerable with said ports; a chamber fast on said turret communicating with said filling opening and having an axial opening; an axial pipe received in said axial opening and duct; a vertically movable frame comprising a cross bar and posts; a filling pipe detachably supported by said bar and discharging into the chamber; and a pipe section supported on said bar and detachably connected to said axial pipe.

24. In combination, a plurality of tanks; a turret base provided with ports; pipes from said ports to said tanks; a turret on said base provided with a filling opening and a duct separately registerable with said ports; a chamber fast on said turrets communicating with said filling opening and having an axial opening; an axial pipe received in said axial opening and duct; a vertically movable frame comprising a cross bar and posts; outer and inner short vertical supporting pipe sections carried by said cross bar; supply and discharge pipes detachably connected to the upper ends of said sections respectively; a filling pipe detachably connected to the lower end of said outer section and having a forwardly turned lower end discharging into the surge chamber; and a collar connection detachably secured on the lower end of said inner section and forming a downwardly disposed pipe receiving socket communicating with said axial pipe.

25. In combination, a plurality of tanks; a turret base provided with ports; pipes from said ports to said tanks; a turret on said base provided with a filling opening and a duct separately registerable with said ports; a chamber fast on said turret communicating with said filling opening and having an axial opening; an axial pipe received in said axial opening and duct; a vertically movable frame comprising a cross bar and posts; a filling pipe supported by said bar and discharging into the chamber; a pipe section supported on said bar and connected to said axial pipe; and means interposed between said posts and chamber to raise said chamber and turret as the frame is raised.

26. In combination, a plurality of tanks; a turret base provided with ports; pipes from said ports to said tanks; a turret on said base provided with a filling opening and a duct separately registerable with said ports; a chamber fast on said turret communicating with said filling opening and having an axial opening; an axial pipe received in said axial opening and duct; a vertically movable frame comprising a cross bar and posts; a filling pipe discharging into the chamber; a pipe section supported on said bar and connected to said axial pipe; collars on said posts each having outwardly disposed closely spaced shoulder lugs; a transverse member; guide collars fast on said transverse member slidably receiving and guiding said posts and each provided with an outer extension having a pair of upturned ears; threaded shackle bolts pivoted between said ears; clamp nuts on the threaded ends of said bolts and adapted to seat on said shoulder lugs when the bolts are between the lugs; and means tending to raise the frame.

27. In combination, a plurality of tanks; a turret base provided with ports; pipes from said ports to said tanks; a turret on said base provided with a filling opening and a duct separately registerable with said ports; a chamber fast on said turret communicating with said filling opening and having an axial opening; a filling pipe discharging into the chamber; a suction pipe received in said axial opening and duct; a transverse member; a vertically movable frame comprising a cross bar, and posts slidable in said member; a chain collar fast on each post provided with an open seat; inverted chairs mounted on the upper part of said chamber; brackets mounted on said posts and the lower part of said chamber and provided with projecting pins adapted to engage in said inverted chairs and said seats when said posts are raised.

28. In combination, a plurality of tanks: a turret base provided with ports; pipes from said ports to said tanks; a turret on said base provided with a filling opening and a duct separately registerable with said ports; a chamber fast on said turrets communicating with said filling opening and having an axial opening; an axial pipe received in said axial opening and duct; a vertically movable frame comprising a cross bar and posts; a filling pipe detachably supported by said bar and discharging into the chamber; a pipe section supported on said bar and detachably connected to said axial pipe; pulleys mounted beneath said transverse member; flexible members disposed over said pulleys and having one end secured to the lower ends of said posts; and weights secured to the other ends of said flexible members.

29. In combination, a plurality of tanks; a turret base provided with ports; pipes from said ports to said tanks; a turret on said base provided with a filling opening and a duct separately registerable with said ports; a chamber fast on said turrets communicating with said filling opening and having an axial opening; an axial pipe received in said axial opening and duct; a vertically movable frame comprising a cross bar and posts; a filling pipe detachably supported by said bar and discharging into the chamber; a pipe section supported on said bar and detachably connected to said axial pipe; counterbalancing means for assisting in raising said movable frame; means to hold said movable frame against upward movement; and means interposed between said posts and chamber to raise said chamber and turret as the frame is raised.

30. In combination, a rectangular supporting table; a frame mounted upon said table and comprising a fixed transverse plate member at its mid part; a plurality of rectangular elongated tanks in said frame on said table arranged in groups of three with their ends near said member; a base resting on said member; means for emptying and filling the tanks including a rotary device on said base adapted to assume positions for filling the tanks; and means for moving said rotary device step by step to said positions.

31. In combination, a plurality of adjacent tanks; and a gutter frame on the edges of the tanks and provided with a gutter separating the tanks, said gutter being provided with a drain channel.

32. In combination, a plurality of adjacent tanks; gutters for preventing overflowing milk from one tank to the adjacent tank, and means for preventing overflow from the gutters.

33. In combination, a plurality of adjacent tanks; means for emptying and filling the tanks; and means for providing gutters between the tanks over the top edges of the tanks, said gutters having continuous walls.

34. In combination, a plurality of adjacent rectangular tanks; means for emptying and filling the tanks; and gutter frames resting on the top edges of the tanks provided with a trough or gutter separating the tanks to catch and prevent any overflow from one tank to the other to prevent mixing of unpasteurized with pasteurized milk, said gutter frame being provided with a drain channel to conduct away the overflow.

35. In combination, a plurality of adjacent tanks; means for emptying and filling the tanks; supporting frames comprising posts and a top bar disposed a considerable distance above substantially over the outer ends of the tanks; strap brackets securing said posts to the corner of the adjacent tanks; link rods pivoted on the end portions of said top bars and normally pending to near the outer ends of the tanks; covers normally disposed over the tanks and said turret and pivoted to said links; and means for locking the covers to said links whereby the covers may be balanced under said bar.

36. In combination, a plurality of adjacent tanks; supporting frames comprising top bars above the outer ends of the tanks; link rods pivoted on said top bars; covers normally disposed over the tanks and said turret and pivoted to said links; upper and lower bolt brackets mounted near the pivoted ends of said link rods; bolt members slidable in said brackets and comprising beveled bolt heads in the upper brackets and headed spindles in the lower brackets; springs on said spindles compressed between said lower brackets and bolt heads; and striking members mounted on the margins of the covers and engageable by the bevels of said bolt heads and adapted to receive the bolt heads when the covers are raised to near said link rods, whereby the covers may be balanced under said bars in approximately horizontal position.

37. In combination, groups of tanks; means for emptying and filling the tanks including a rotary member disposed between the groups adapted to assume successive positions relative to the tanks; a cover for the respective groups each cover extending to said rotary member and the other cover.

38. In combination, a plurality of adjacent tanks; means for emptying and filling the tanks; gutters on the upper edges of the tanks; and a cover over said tanks and gutters.

39. In combination, a frame comprising a fixed transverse plate; a plurality of rectangular elongate tanks in said frame arranged in groups of three with their ends near said plate member; gutter frames resting on the top edges of the tanks and provided with a gutter separating the tanks; means for emptying and filling the tanks including a base resting on said plate member, a turret thereon and pipes extending to the respective tanks; covers normally disposed respectively over said groups of tanks and each comprising an intramarginal plateau, slopes around said plateau, a flat margin disposed around said slopes over the outermost gutters and an inner end platform disposed over said turret and pipes and meeting the adjacent platform in a line of parting; bosses on the end slopes having sight openings therethrough; and covers on said bosses.

40. In combination, a pair of members having contacting faces; and a filling opening and a suction duct passing through said members and faces; one of said faces being provided with a groove passing between said duct and opening.

41. In combination, a flat base having ports communicating with the tanks; a turret resting on said base provided with a filling opening and an emptying duct registerable with adjacent ports; a chamber fast on said turret having an opening registerable with said filling opening and an axial opening registering with said duct; and means for supplying liquid to said chamber and withdrawing liquid from said axial opening and duct.

42. In combination, a flat base having ports communicating with the tanks; a turret resting on said base provided with a filling opening and an emptying dust registerable with adjacent ports; a chamber fast on said turret having an opening registerable with said filling opening; an axial pipe communicating with said duct; means for supplying liquid to said chamber and withdrawing liquid from said axial pipe.

43. In combination, a flat base having ports communicating with the tanks; a turret resting on said base provided with a filling opening and an emptying duct registerable with adjacent ports; a chamber fast on said turret having an opening registerable with said filling opening; means for supplying liquid to said chamber and withdrawing liquid from said duct; and means for raising the chamber.

44. In combination, a flat base having ports communicating with the tanks; a turret resting on said base provided with a filling opening and an emptying duct registerable with said adjacent ports; a chamber on said turret having an opening registerable with said filling opening; means for supplying liquid to said chamber and withdrawing liquid from said duct; means tending yieldably to raise said chamber and turret.

45. In combination, a flat base having ports communicating with the tanks; a turret resting on said base provided with a filling opening and an emptying duct registerable with adjacent ports; a chamber fast on said turret having an opening registerable with said filling opening; means for supplying liquid to said chamber and withdrawing liquid from said duct; a vertically movable frame; means tending yieldably to raise the frame; and means establishing connection between the frame and chamber for raising the chamber and turret when the frame is raised.

46. In combination, a frame; a plurality of elongated tanks arranged parallel and side by side in groups disposed on opposite sides of said frame with the ends of the tanks next to the frame; and means for emptying and filling the tanks including a base on said frame and a rotary device on said base adapted to assume positions for filling and emptying the tanks.

47. In combination, a plurality of tanks; means for emptying and filling the tanks including a rotary member adapted to assume successive positions relative to the tanks; means for moving said rotary member to said successive positions; and means for holding said member stationary in said positions to give full time for the filling and emptying.

48. In combination, a plurality of tanks for treating liquids; means for emptying and filling the tanks including a rotary member adapted to assume successive positions relative to the tanks; means for moving said rotary member to said successive positions; means for holding said member stationary for a period of time in each of said positions; and timed means for controlling the length of said periods and the resulting treatment.

49. In combination, a plurality of tanks; means for emptying and filling the tanks including a rotary member adapted to assume successive positions relative to the tanks; drive means for moving said rotary member to said successive positions; and timed means timed independently of said drive means for timing the period of rotation of said rotary member.

50. In combination, a plurality of tanks; means including a rotary member adapted to successively withdraw treated liquid from one tank and then to fill the emptied tank with liquid to be treated; drive means for driving said rotary member; and timed means for timing the period of treatment independently of the speed of movement of said drive means.

51. In combination, a plurality of tanks; means including a rotary member adapted to assume successive positions to fill an emptied tank with liquid to be treated and then to withdraw the treated liquid from the tank; yieldable drive means for driving said rotary member; an escapement acting on said drive for holding said rotary member in operative position; and timed means for releasing the escapement for timing the period of treatment independently of the speed of movement of the drive means.

52. In combination, a plurality of tanks for treating liquids; means including a rotary member adapted to successively withdraw treated liquid from one tank and then to fill the emptied tank with liquid to be treated; and adjusting means adjacent to the tank for adjustably timing the period of treatment between filling and emptying.

53. In combination, a plurality of tanks; means including a rotary member adapted to successively withdraw treated liquid from one tank and then to fill the emptied tank with liquid to be treated; yieldable drive means for driving said rotary member; and adjustable timing means timed independently of said drive means for timing the period of rotation of said rotary member for adjustably timing the period between the filling and emptying of a tank.

54. In combination, a plurality of tanks; means for emptying and filling the tanks including a rotary member adapted to assume successive positions relative to the tanks; means for yieldably moving said rotary member step by step to said successive positions and holding it in said positions to give full time for filling and emptying; and a governor for said drive means.

55. In combination, a plurality of adjacent tanks; covers for the tanks; supports above the tanks; links connected to said support and margins of the covers; and means for fastening said cover to the links at an acute angle thereto.

56. In combination, a plurality of adjacent tanks; means for emptying and filling the tanks; covers for the tanks; supports above the tanks; link rods hinged at the upper end to said support and at the lower ends to said covers near the edge thereof; and means for holding the cover and rods approximately parallel to each other for suspending the covers away from the tanks.

57. In combination, a plurality of adjacent tanks; means for emptying and filling the tanks; covers for the tanks; supports substantially directly above the edge of the tanks; link rods hinged to said support and the edge of the covers respectively; and means for fastening the covers to the rods substantially parallel therewith for suspending the covers away from the tanks.

58. In combination, a plurality of adjacent tanks; means for emptying and filling the tanks; covers for the tanks including a flat intramarginal plateau and a slope therearound; bosses on the slopes each having a sight opening therethrough.

Signed at New York, in the county of New York and State of New York this 15th day of December A. D. 1924.

EMIL BEHRINGER.